UNITED STATES PATENT OFFICE.

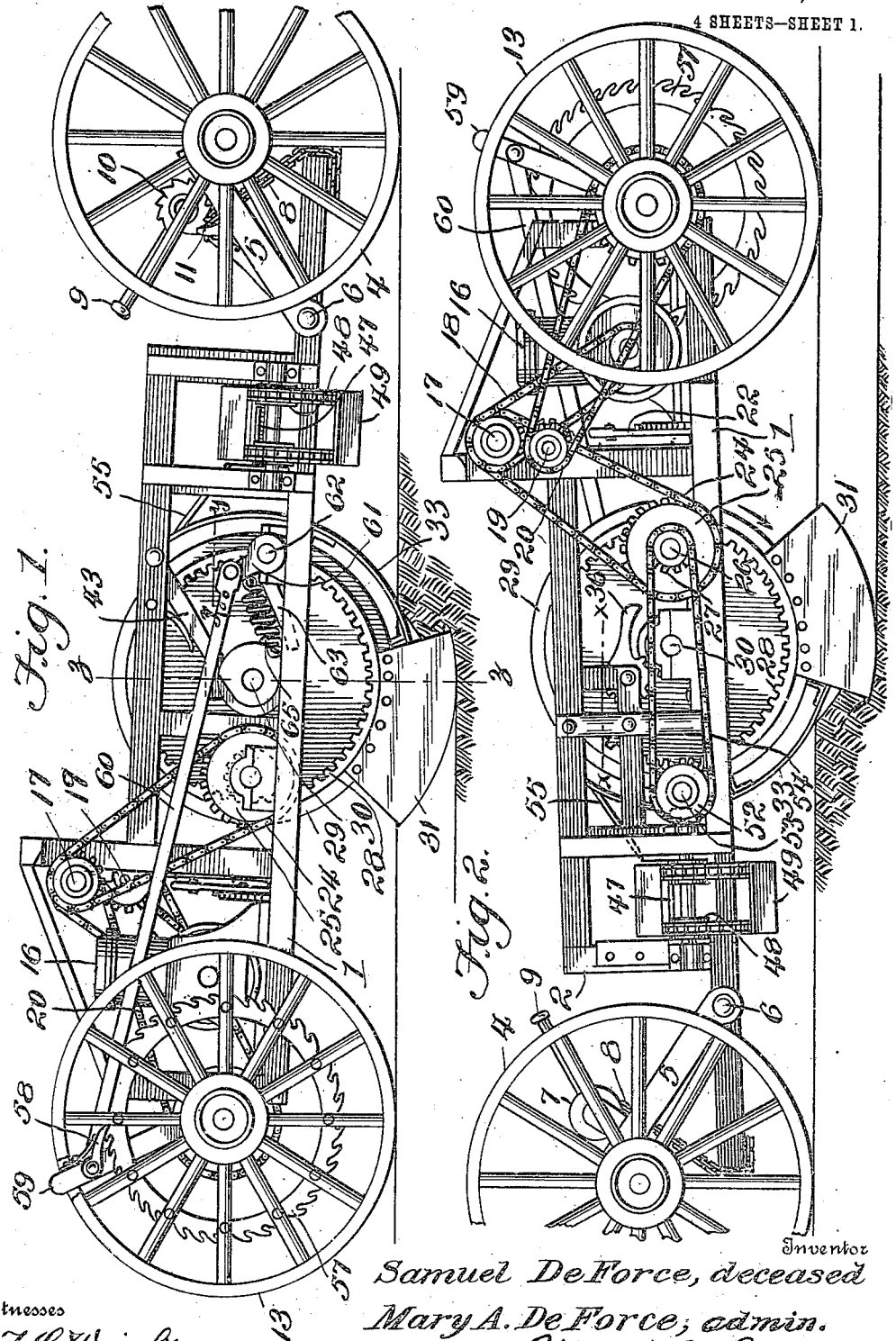

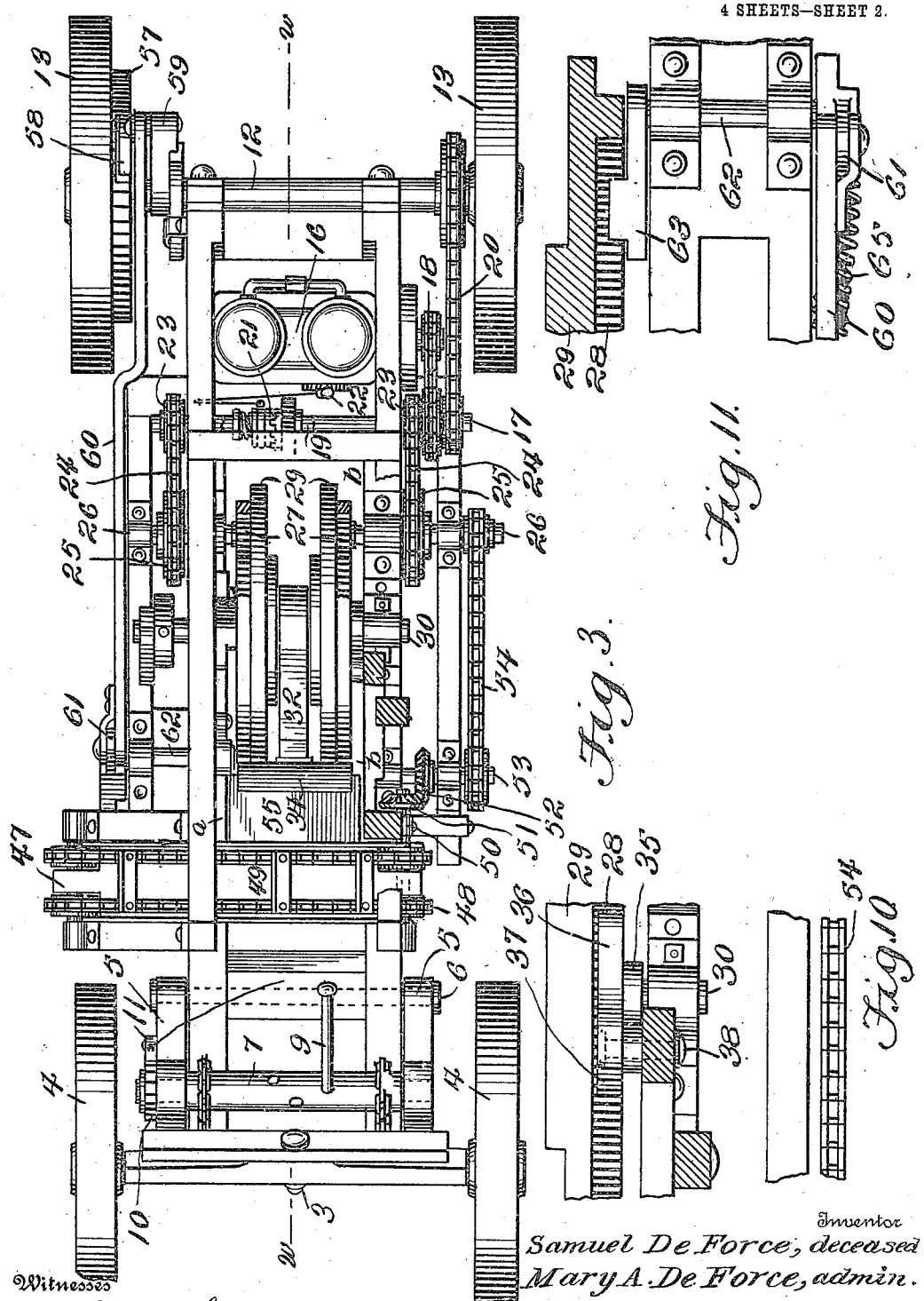

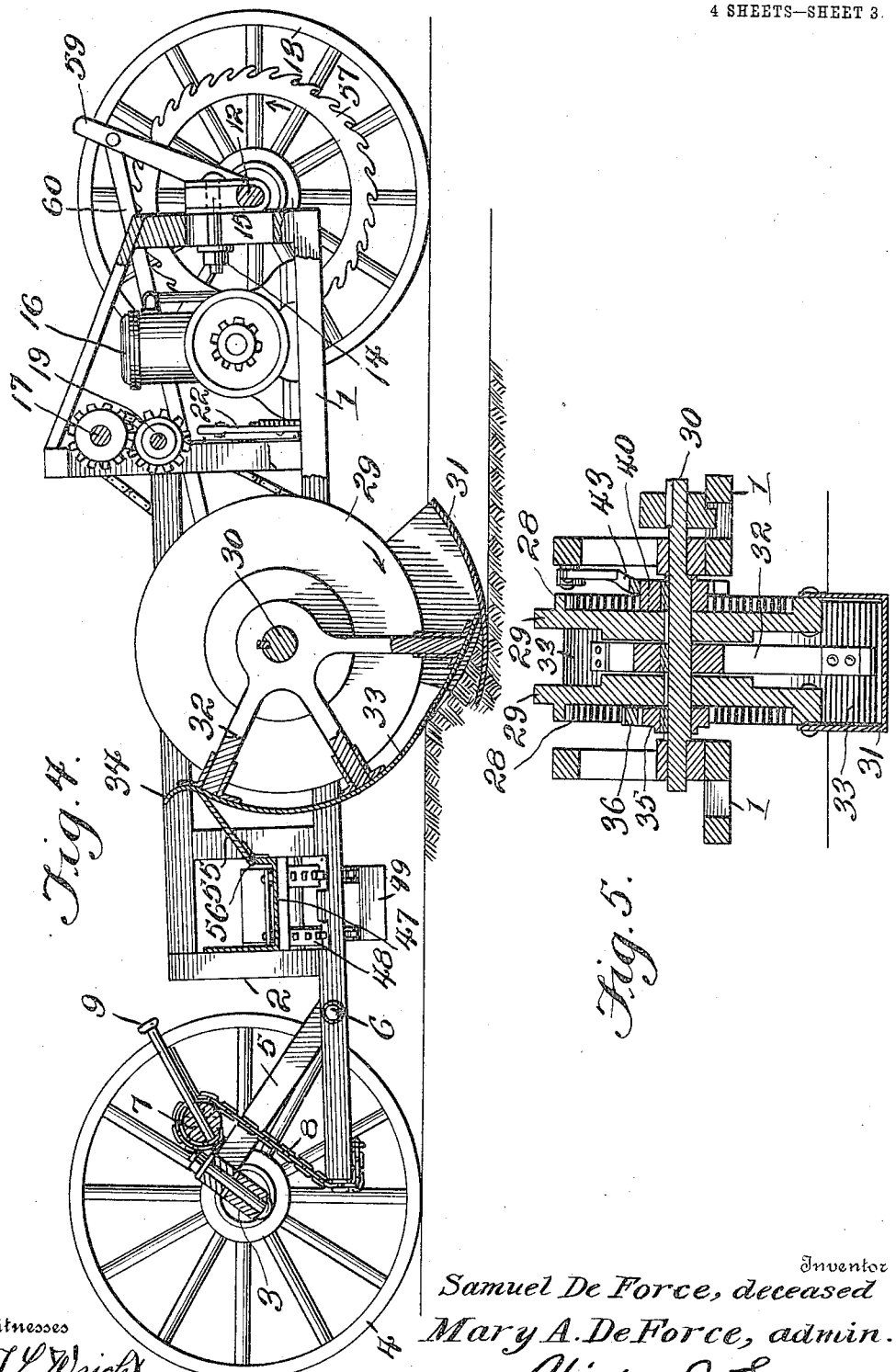

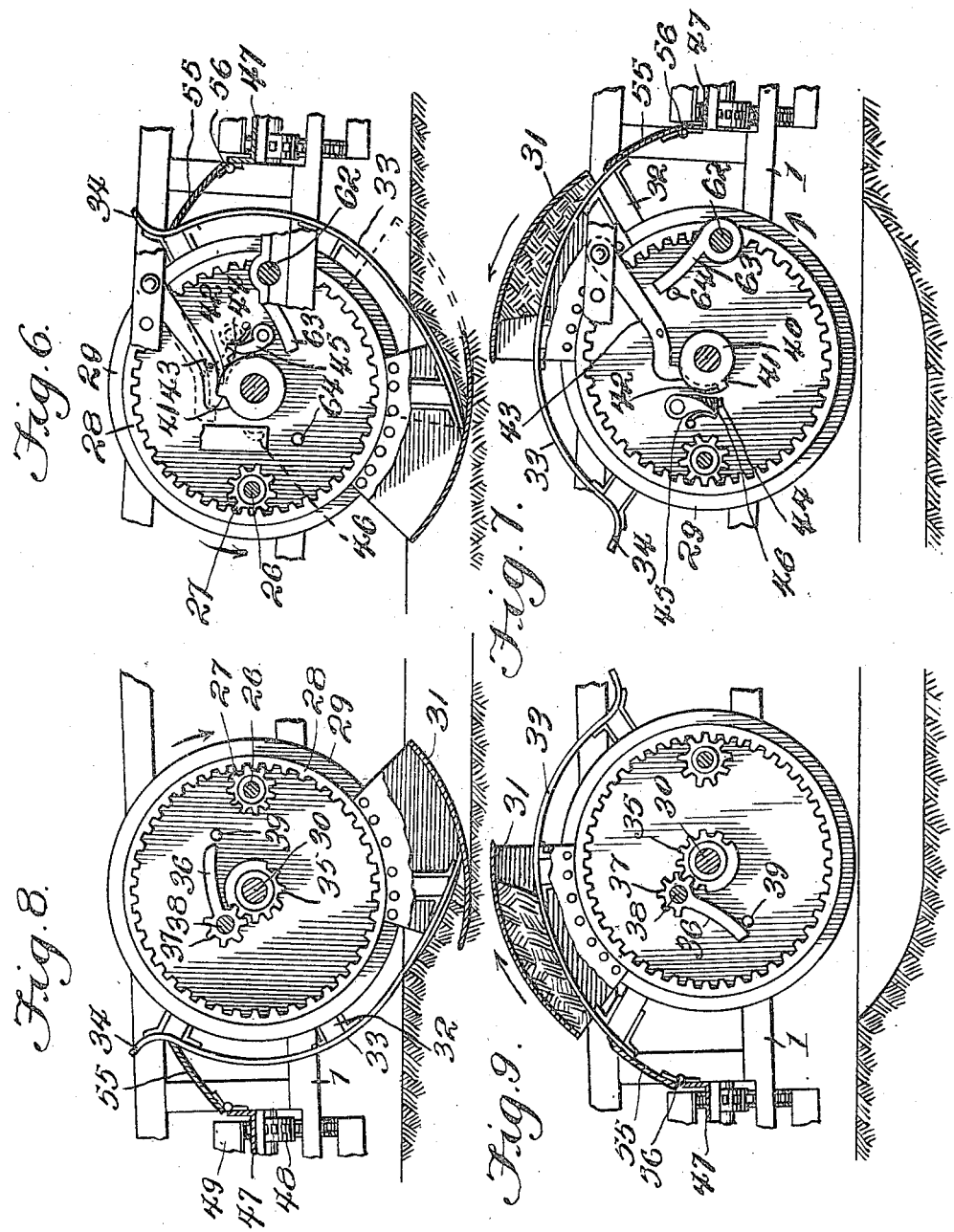

SAMUEL DE FORCE, DECEASED; MARY A. DE FORCE, ADMINISTRATRIX, OF CORRY, PENNSYLVANIA, ASSIGNOR TO WILLIAM A. DE FORCE, OF VERMEJO PARK, TERRITORY OF NEW MEXICO.

DITCHING-MACHINE.

963,021.  Specification of Letters Patent.  Patented June 28, 1910.

Application filed November 10, 1909. Serial No. 527,355.

*To all whom it may concern:*

Be it known that SAMUEL DE FORCE, deceased, late a citizen of the United States, (MARY A. DE FORCE, a citizen of the United States, residing at Corry, in the county of Erie and State of Pennsylvania, administratrix of said SAMUEL DE FORCE,) did invent new and useful Improvements in Ditching-Machines, of which the following is a specification.

The purpose of the present invention is to devise a mechanism designed most especially for digging trenches either for draining land or to receive tile for carrying off water in meadow lands or for other purpose requiring the formation of trenches either for agricultural purposes or for protecting roadways.

One object of the invention is the provision of a machine of the character aforesaid which will admit of the cutting mechanism being adjusted vertically to form a trench of given depth according to the purpose and object in view.

A further purpose of the invention is to provide a novel form of rotary cutter and to combine therewith a clearer which is intermittently actuated, so as to remove the earth from the cutter and insure delivery of such earth upon a conveyer by means of which it is delivered at one side of the trench.

The invention also has for its object to provide novel means automatic in operation for positively moving the clearer both forwardly and backwardly thereby preventing continuous rotation of the clearer with the cutter which would be objectionable in the construction and operation of the machine as devised.

The invention also contemplates means for intermittently advancing the machine to its work, the forward movement being imparted to the machine during the time that the earth previously removed from the trench is discharging from the cutter onto the conveyer.

The invention further contemplates and resides in the novel features, details of construction and combinations of parts which hereinafter will be more particularly set forth, illustrated in the accompanying drawings and finally claimed.

In the drawings forming a part of the specification: Figure 1 is a side view of a ditching machine embodying the invention. Fig. 2 is a view of the machine as seen from the reverse side. Fig. 3 is a top plan view. Fig. 4 is a vertical central longitudinal section on the line $w$—$w$ of Fig. 3. Fig. 5 is a transverse section on the line $z$—$z$ of Fig. 1. Fig. 6 is a sectional view on the line $a$—$a$ of Fig. 3 showing the cutter in position for removing earth from the trench and the clearer in lowered position. Fig. 7 is a view of the parts illustrated in Fig. 6 showing the cutter at its topmost position and the clearer at the limit of its forward stroke. Fig. 8 is a sectional view on the line $b$—$b$ of Fig. 3 showing the parts in the position illustrated in Fig. 6. Fig. 9 is a view of the parts shown in Fig. 8 in the position in which they appear in Fig. 7. Fig. 10 is a detail section on the line $y$—$y$ of Fig. 1. Fig. 11 is a detail section on the line $x$—$x$ of Fig. 2.

Corresponding and like parts are referred to in the following description and indicated in all the views of the drawings by the same reference characters.

The working parts of the machine are mounted upon a suitable frame-work which in turn is provided with fore and hind trucks which latter are relatively adjustable to admit of the cutting mechanism being raised or lowered according to the required depth of the trench to be cut. The fore truck is mounted to turn about a king bolt or vertical axis to admit of properly steering the machine according to the prescribed line of trench to be cut. The main frame may be of any construction and comprises longitudinal beams 1, which are suitably connected by transverse beams. Vertical posts 2 rise from the beams 1 and are connected at their upper ends both by longitudinal and transverse beams, the whole forming a substantial structure for receiving the coöperating parts. The fore truck comprises an axle 3 and ground wheels 4, and is connected to pivoted beams 5 attached to the longitudinal beams 1 at 6. A windlass 7 is mounted upon the front portion of the pivoted beams 5 and short chains or flexible connections 8 connecting said windlass with the front ends of the longitudinal beams 1, said windlass being adapted to be turned by means of a lever 9 so as to wind the chains or flexible connections 8 thereon. A ratchet wheel 10 fast to an end of the windlass 7 is adapted to coöperate with a pawl 11 so as to hold the windlass against backward rotation whereby the front end of the framework is supported at the desired elevation from the ground. The hind truck comprises an axle 12 and ground wheels 13 and is vertically adjustable being secured in the desired position by means of bolts or like fastenings 14 passing through vertical slots 15 in the rear posts or uprights of the framework.

An engine 16 is mounted upon the framework of the machine and may be of any type and is adapted to operate both the cutting mechanism as well as propel the machine. A transverse shaft 17 is mounted upon the framework of the machine and is connected with the shaft of the engine so as to receive power therefrom. A sprocket chain 18 connects a sprocket wheel fast to the shaft of the engine with a sprocket wheel fast to the shaft 17. A second shaft 19 is arranged beneath the shaft 17 and is geared thereto and a sprocket chain 20 connects a sprocket wheel fast thereto with a sprocket wheel fast to the rear axle so as to drive the machine over the ground when it is required to propel the same directly from the engine as when moving from place to place. A clutch 21 is provided upon the shaft 19 to throw said shaft into and out of gear according as the rear axle 12 is to be driven directly from the engine to be disconnected therefrom. The clutch 21 is adapted to be operated by means of a lever 22. The shaft 17 is provided near each end with a sprocket wheel 23 which is connected by means of a sprocket chain 24 with a sprocket wheel 25 fast to a short shaft 26 so as to operate the same. The shafts 26 are in transverse alinement and are provided at their inner ends with spur gears 28 of wheels 29 loose upon an axle 30 mounted in bearings applied to the longitudinal beams 1. The several parts are of such relative proportions as to rotate the wheels 29 at a uniform speed. The wheels 29 are transversely spaced and form rotary supports for the cutter 31. The cutter 31 is of scoop form and comprises side pieces and an outer connecting piece which is of curved form, its forward edge being sharpened to penetrate the earth. When the machine is in operation the wheels 29 are continuously rotated in the direction indicated by the arrows in the several views.

The clearer is fast to the shaft 30 and rotates therewith, and is arranged in the space formed between the wheels 29 and is adapted to receive an oscillatory movement, independent means being provided for positively moving the clearer forwardly and backward. The clearer comprises a hub, a series of arms 32, and a curved plate 33 secured to the outer ends of the arms 32 and having one end outwardly curved as at 34 to form a scraper for removing the earth from the cutter. The shaft 30 to which the clearer is attached has a rocking movement imparted thereto so as to throw the clearer forwardly and backwardly. A mutilated gear 35 is fast to an end portion of the shaft 30 and a lever 36 having a pivot head 37 is arranged to coöperate with the mutilated gear 35 to return the clearer to normal position. The lever 36 is mounted upon a shaft 38 secured to a part of the frame-work. A pin 39 fast to the wheel 29 is adapted in the rotation of the cutter to engage with the lever 36 and move the same from the position indicated in Fig. 9 to the position indicated in Fig. 8 thereby returning the clearer to normal position. A cam 40 fast to the opposite end portion of the shaft 30 is provided with a shoulder 41 and a notch 42. A dog 43 pivoted at one end to the framework has its opposite end of hook-form and adapted to engage with the shoulder 41 so as to hold the shaft 30 against forward movement during the operation of the cutting mechanism as indicated most clearly in Fig. 6. A dog 44 pivoted at one end to the wheel 29 adjacent the cam 40 and dog 43 is adapted to enter the notch 42 the instant the dog 43 has been tripped and thereby cause the cam 40 and shaft 30 to move forward and bring the clearer into the position indicated in Figs. 7 and 9. The dog 44 is provided upon one side with an extension 45 forming a trip which is adapted to engage with the dog 43 and disengage the same from the shoulder 41. This operation takes place an instant before the dog 44 drops into the notch 42 so as to cause an interlocking between the shaft 30 and wheel 29, which latter forms a part of the cutting mechanism. The dog 44 is normally pressed toward the cam 40 by means of a spring. A stop 46 extended inward from a part of the frame-work is arranged to engage with the extension 45 of the dog 44 and trip said dog so as to release the same from the cam 40 and thereby permit return of the clearer to normal position. The dog 44 is tripped or released from the cam 40 a moment prior to the operation of the pin 39 upon the lever 36 whereby in the further rotation of the cutting mechanism the pin 39 engaged with the lever 36 turns the same upon the shaft 38 and by reason of the intermeshing cog gearing 35 and 37 the shaft 30 is turned backward so as to return the clearer to the given position.

A conveyer is located forward of the cutting mechanism and is adapted to deliver the earth to one side of the machine and may be of any construction. As shown, the conveyer comprises a support 47, endless chains 48, and cross pieces 49 the latter serving to move the earth over the support 47.

The endless chains 48 are supported upon sprocket wheels at opposite ends of the support 47. A set of sprocket wheels are fast to a shaft 50 which is provided at one end with a bevel gear 51 which meshes with a companion bevel gear 52 fast to a shaft 53 which latter is connected by means of a sprocket chain 54 with the adjacent shaft 26, both shafts 53 and 26 being provided with sprocket wheels around which the sprocket chains 54 pass. An apron 55 is arranged to extend across the space formed between the clearer and conveyer so as to direct the earth removed from the cutter 31 onto the said conveyer. The apron 55 consists of a plate which is pivoted at 56 and normally inclines upwardly and rearwardly. By having the apron or plate 25 pivoted and inclined upwardly and rearwardly its upper edge maintains a close fit with the plate 33 of the clearer thereby preventing any escape of earth, said apron at the same time serving to scrape any earth that may tend to cling to the outer side of the clearer.

A ratchet wheel 57 is secured to or formed with one of the rear wheels 13 and a dog 58 is arranged to coöperate therewith, said dog being pivoted to a lever 59 mounted upon the rear axle. A bar or rod 60 is pivotally connected at one end to the lever 59 and its opposite end is pivotally connected to a crank arm 61 fast to the outer end of a shaft 62, said shaft having an arm 63 fast to its inner end and arranged to be engaged by a pin 64 fast to the adjacent wheel 29. At each revolution of the cutting mechanism, the arm 63 is oscillated thereby rocking the shaft 62 and causing a forward movement of the machine by the action of the dog 58 upon the teeth of the ratchet wheel 57. A spring 65 normally returns the shaft 62 and arm 63 to given position.

The two wheels 29 and cutter 31 constitute the cutting mechanism. When transporting the machine over the road or field the clutch 21 is drawn into gear thereby utilizing the force of the engine 16 for driving the rear wheels 13 which by their tractive force upon the surface over which the machine travels, cause positive movement thereof. When the machine is in operation for digging a trench the clutch 21 is drawn out of gear thereby enabling the force of the engine 16 to be utilized for operating the cutting mechanism and the other working parts of the machine, such as the clearer, conveyer and propelling mechanism. The cutting mechanism is continually rotated and at each revolution takes up a certain amount of earth which is lifted by means of the cutter 31. The apron 55 moves to admit of the cutter passing thereby. The clearer is operated and serves to close the open side of the cutter and support the earth therein. After the cutter has cleared the apron 55, the clearer is actuated to throw the plate 33 upwardly and forwardly as indicated in Figs. 7 and 9 thereby separating the earth. The clearer is actuated by means of the dog 44 entering the notch 42 of the cam 40. After the parts have assumed the position shown in Figs. 7 and 9, the dog 44 is tripped to release the cam 40 and shaft 30 and a moment thereafter, the pin 39 comes in contact with the lever 36 and moves to bring the clearer into position as indicated in Figs. 6 and 8. Upon the return stroke of the clearer to normal position, the scraper 34 moves through the cutter and removes the earth therefrom, said earth being directed by the apron 55 upon the conveyer which latter discharges the earth at one side of the machine as will be readily understood. During the discharge of the earth, the pin 64 operates the arm 63 and through the connections turns the rear wheels 13 and moves the machine forward preliminary to the next operation of the cutting mechanism. The cutting mechanism is adapted to be raised or lowered for regulating the depth of the trench or ditch by raising or lowering the frame-work in the manner herein indicated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that such changes may be made when desired as are within the scope of the claims appended hereto.

Having thus described the invention, what is claimed is—

1. In a ditching machine, the combination of cutting mechanism comprising transversely spaced supports, a cutter carried by said supports and spanning the space formed between them, means for rotating the cutting mechanism, and a clearer adapted to operate in the space formed between said supports.

2. In a ditching machine, the combination of cutting mechanism comprising transversely spaced supports, a cutter carried by said supports and spanning the space formed between them, means for rotating the cutting mechanism, a clearer adapted to operate in the space formed between said supports, and means for moving said clearer forwardly and backwardly.

3. In a ditching machine, the combination of transversely spaced rotary supports, a cutter carried by said supports, and spanning the space formed between them, and a clearer arranged to operate between said supports and to close the inner side of the cutter and support the earth therein.

4. In a ditching machine, the combination of transversely spaced rotary supports, a shaft having said supports loosely mounted thereon, a cutter carried by said rotary supports and spanning the space formed between them, a clearer arranged between said supports and fast to said shaft to turn therewith, operating means between one of said supports and shaft to turn the latter part way in one direction to move the clearer forwardly, and other connections between the said shaft and the other support to turn the shaft in an opposite direction and return the clearer to normal position.

5. In a ditching machine, the combination of rotary cutting mechanism, a clearer, means for holding the clearer stationary during a partial rotation of the cutting mechanism, and other means actuated by the cutting mechanism to effect the release of the clearer, and to move the same forwardly, and other means actuated by the cutting mechanism to effect return of the clearer to normal position.

6. In a ditching machine, the combination of transversely spaced rotary supports, a cutter of scoop form attached to said supports, and movable therewith, a clearer arranged between the supports and adapted to close the open side of the cutter, means actuated by the cutting mechanism to throw the clearer forwardly, and other means actuated by the cutting mechanism to effect return of the clearer to normal position.

7. In a ditching machine, the combination of rotary cutting mechanism, a transversely arranged conveyer for discharging the earth to one side of the machine, an apron extending across the space formed between the cutting mechanism and the conveyer, and a clearer adapted to coöperate with the cutting mechanism to effect discharge of the earth from the cutter and delivery thereof upon said apron.

8. In combination, a frame-work mounted upon trucks, a rotary cutting mechanism, a ratchet wheel connected with one of the truck wheels, a dog arranged to coöperate with said ratchet wheel, and means actuated by the rotary cutting mechanism to operate said dog and effect a forward step by step movement of the machine.

9. In combination, a transversely arranged shaft, rotary supports loose upon said shaft, a cutter carried by said supports and spanning the space formed between them, a clearer fast to the shaft and arranged to operate in the space formed between said rotary supports, and adapted to close the inner open side of said cutter, said clearer having a scraper to effect removal of the earth from the cutter, coöperating means between one of the rotary supports, and shaft to effect partial rotation of said shaft to move the clearer forwardly, another set of coöperating means between said shaft and the other rotary support for rotating the shaft in a reverse direction to return the clearer to normal position.

10. In combination, a transversely arranged shaft, rotary supports loose upon said shaft, a clearer fast to said shaft, and arranged to operate in the space formed between said rotary supports, a cutter fast to the rotary supports and adapted to coöperate with said clearer, a shouldered cam fast to said shaft, a dog pivoted to the framework of the machine and adapted to engage the shoulder of the cam to hold the shaft in given position, a second dog mounted upon a rotary support and adapted to trip the first dog and release the cam, and a moment thereafter to engage with the cam and cause forward movement of the shaft, a mutilated gear fast to said transverse shaft, a lever mounted upon the frame-work of the machine and having a toothed portion meshing with the teeth of the mutilated gear, and a pin carried by the other rotary support to engage with said lever and return the shaft and clearer to a given position.

In testimony whereof I affix my signature in presence of two witnesses.

MARY A. DE FORCE,
*Administratrix of the estate of Samuel De Force, deceased.*

Witnesses:
    ANNA BURNS,
    C. L. ALEXANDER.